United States Patent [19]
Takahashi et al.

[11] Patent Number: 5,859,940
[45] Date of Patent: Jan. 12, 1999

[54] OPTICAL DEVICE AND BIDIRECTIONAL COMMUNICATIONS SYSTEM

[75] Inventors: Mitsuo Takahashi; Yuying Wu, both of Matsudo, Japan

[73] Assignee: Seiko Giken Co., Ltd., Matsudo, Japan

[21] Appl. No.: 813,332

[22] Filed: Mar. 7, 1997

[30] Foreign Application Priority Data

Jul. 30, 1996 [JP] Japan ................................ 8-216636

[51] Int. Cl.$^6$ .................................................. G02B 6/32
[52] U.S. Cl. .............................................. 385/34; 385/31
[58] Field of Search ................ 385/11, 141, 31, 385/33, 34, 35, 36, 39, 129, 147

[56] References Cited

U.S. PATENT DOCUMENTS

| | | | |
|---|---|---|---|
| 3,853,384 | 12/1974 | Pinnow et al. | 385/141 |
| 4,946,239 | 8/1990 | Garmon | 385/43 |
| 5,159,481 | 10/1992 | Maeda | 385/11 |
| 5,420,688 | 5/1995 | Farah | 250/227.27 |

*Primary Examiner*—Akm E. Ullah
*Attorney, Agent, or Firm*—Spencer & Frank

[57] ABSTRACT

An optical device employing a GRIN rod lens, which optical device makes full use of the characteristics of a single-mode optical fiber and which permits extremely easy adjustment; an optical wavelength demultiplexer/multiplexer which utilizes a GRIN rod lens and a pass filter; and a bidirectional communications system which utilizes a pair of the aforesaid optical wavelength demultiplexers/multiplexers. The optical device is constructed by a GRIN rod lens, a reflecting surface which is disposed on one end surface of the GRIN rod lens, and a ferrule which supports the distal ends of a first optical fiber and a second optical fiber symmetrically with respect to a central axis thereof and which is connected to the other end surface of the GRIN rod lens with the central axis thereof aligned with the optical axis of the GRIN rod lens. The core diameter of the second optical fiber is made sufficiently larger than the core diameter of the first optical fiber. The first optical fiber is a single-mode optical fiber, while the second optical fiber is a multi-mode optical fiber.

6 Claims, 4 Drawing Sheets

$S_1 = S_2$

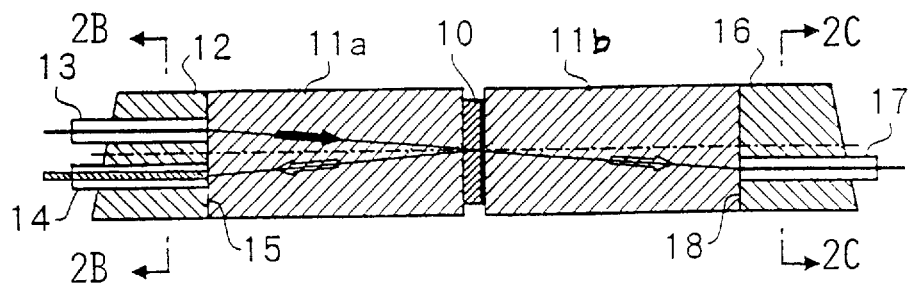
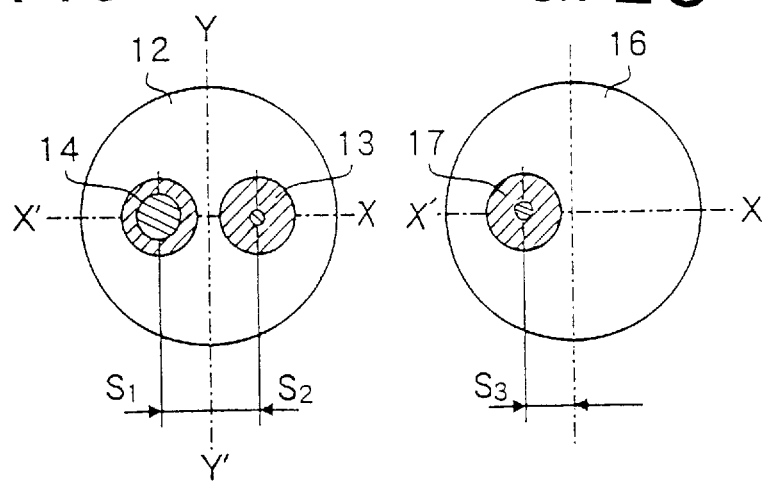
$S_1 = S_2 = S_3$     $S_1 = S_2 = S_3$ $S_1 = S_2 = S_3$      $S_1 = S_2 = S_3$

OPTICAL DEVICE AND BIDIRECTIONAL COMMUNICATIONS SYSTEM

BACKGROUND OF THE INVENTION

1. Field of the Invention

The present invention relates to an optical device which employs a GRIN rod lens, a single-mode bidirectional optical wavelength demultiplexer/multiplexer which utilizes the optical device, and a bidirectional communications system which utilizes the optical wavelength demultiplexer/multiplexer.

2. Description of the Related Art

Various optical devices can be formed by combining GRIN rod lenses and optical fiber ferrules. A problem with these devices will be described in conjunction with a reference example that the present inventors have studied. FIGS. 4A to 4C are sectional views illustrative of a reference example of an optical device which uses GRIN rod lenses; this device is used for a bidirectional optical divider coupler by employing a pass filter. A pass filter 1 is provided between GRIN rod lenses 2a and 2b which are disposed with the optical axes thereof aligned. The pass filter 1 is characterized in that it reflects a light wavelength $\lambda_1$ and allows a light wavelength $\lambda_2$ to pass through; at the central part of a ferrule 4 on the opposite side, two single-mode optical fibers 5 and 6 are inserted and fixed symmetrically with respect to the central axis thereof. An end surface 4a of the ferrule is connected to an end surface of the GRIN rod lens 2a by gluing or by other similar means.

A ferrule 8 on a transmitting end supports an optical fiber 9; the ferrule 8 on the transmitting end is connected to a GRIN rod lens 21b through an end surface 8a thereof so that the optical fiber 9 may receive a transmitted light $\lambda_2$ of the pass filter 1.

This optical wavelength demultiplexer/multiplexer is characterized by its large isolation; an isolation value of 40 dB or more can be easily achieved in this reference example while the isolation value of an optical wavelength demultiplexer/multiplexer manufactured by a heat drawing process is approximately 15 dB. Achieving a minimized connection loss, however, requires precise, utmost control during the manufacturing process. Specifically, as shown in the enlarged sectional view, precise symmetrical positioning must be attained so that the positional relationship between the optical axes of the GRIN rod lenses and the optical axes of all the single-mode optical fibers substantially satisfies a requirement of $S_1=S_2=S_3$. Further adjustment is required to assure that the optical axes are accurately positioned on a line X–X' on XY rectangular coordinates.

When using the single-mode optical fibers, connection loss IL in dB caused by misaligned optical axes is defined as follows:

$$IL \text{ (dB)} = -10\log \exp[-(d/\omega)^2]$$
$$\approx 4.343 \ (d/\omega)^2$$

where d: Dislocation of optical axes of optical fibers from those of GRIN rod lenses $d=S1-S2$ or $d=S1-S3$ $\omega$: Mode field radius of fiber core About 4 $\mu$m for a typical single-mode optical fiber
About 25 $\mu$m for a typical multi-mode optical fiber In the case of the aforesaid typical single-mode optical fiber, the insertion loss is 1.09 dB when $\omega=4$ $\mu$m and dislocation of optical axes is d=2 $\mu$m.

A different formula is used for the multi-mode optical fiber; however, if the same formula is approximatively applied, then a permissible dislocation (d) of optical axes resulting in the same insertion loss would be 12.5 $\mu$m. This means easier adjustment.

The single-mode optical fibers are extensively used mainly because they permit broader-band transmission and lower transmission loss. As described above, however, it is not easy to accurately align the cores in assembling an optical wavelength demultiplexer/multiplexer for single-mode optical fibers and advanced techniques and many man-hours are required. For this reason, the optical wavelength demultiplexer/multiplexer for single-mode optical fibers has not been widely disseminated despite the good optical performance thereof.

SUMMARY OF THE INVENTION

Accordingly, it is an object of the present invention to provide an optical device employing GRIN rod lenses, which optical device makes full use of the characteristics of single-mode optical fibers and which permits extremely easy adjustment.

It is another object of the present invention to provide a single-mode bidirectional optical wavelength demultiplexer/multiplexer which utilizes the aforesaid optical device.

It is still another object of the present invention to provide a bidirectional communications system which utilizes the aforesaid single-mode bidirectional optical wavelength demultiplexer/multiplexer.

To these ends, according to one aspect of the present invention, there is provided an optical device equipped with: a GRIN rod lens; a reflecting surface which is disposed on one end surface of the GRIN rod lens; and a ferrule which supports the distal ends of a first optical fiber and a second optical fiber symmetrically with respect to a central axis thereof and which is connected to the other end surface of the GRIN rod lens with the central axis thereof aligned with the optical axis of the GRIN rod lens; wherein the core diameter of the second optical fiber is made sufficiently larger than the core diameter of the first optical fiber.

The first optical fiber may be a single-mode optical fiber, while the second optical fiber may be a multi-mode optical fiber.

According to another aspect of the present invention, there is also provided an optical wavelength demultiplexer/multiplexer equipped with: a first GRIN rod lens and a second GRIN rod lens which are disposed with the optical axes thereof aligned; a pass filter which is disposed between the GRIN rod lenses; a first ferrule which supports the distal ends of a first optical fiber and a second optical fiber symmetrically with respect to a central axis thereof and which is disposed with the central axis thereof aligned with the optical axis of the first GRIN rod lens; and a second ferrule which supports a third optical fiber; wherein a ray of light which enters the first GRIN rod lens from the first optical fiber and which is reflected by the pass filter is led into the second optical fiber, then the ray of light passes through the pass filter and the second GRIN rod lens before it is received by the third optical fiber; and the core diameter of the second optical fiber is made sufficiently larger than the core diameter of the first optical fiber.

In the optical wavelength demultiplexer/multiplexer, the first and the third optical fibers may be single-mode optical fibers, while the second optical fiber may be a multi-mode optical fiber. The core diameter of the second optical fiber may be 50 μm or more.

According to still another aspect of the present invention, there is provided a bidirectional communications system equipped with: a first optical device according to one aspect of the invention wherein the transmitting wavelength of the pass filter is set to $\lambda_1$ and the reflecting wavelength thereof is set to $\lambda_2$; a second optical device according to one aspect of the invention wherein the transmitting wavelength of the pass filter is set to $\lambda_2$ and the reflecting wavelength thereof is set to $\lambda_1$; and means for connecting a first optical fiber of the first optical device and a first optical fiber of the second optical device; wherein a ray of light of the wavelength $\lambda_1$ transmitted from a third optical fiber of the first optical device is received via a second optical fiber of the second optical device and a ray of light of the wavelength $\lambda_2$ transmitted from a third optical fiber of the second optical device is received via a second optical fiber of the first optical device.

BRIEF DESCRIPTION OF THE DRAWINGS

FIG. 2A is a sectional view illustrative of an embodiment of an optical coupler, i.e. an optical wavelength demultiplexer/multiplexer, in accordance with the present invention;

FIG. 2B is a sectional view along with the line 2B—2B shown in FIG. 2A;

FIG. 2C is a sectional view along with the line 2C—2C shown in FIG. 2A;

DESCRIPTION OF THE PREFERRED EMBODIMENT

Figure 1A:
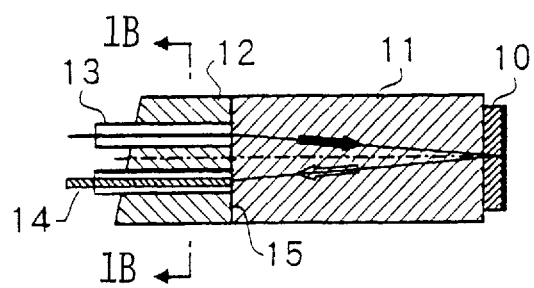
FIG. 1A is a sectional view illustrative of an embodiment of an optical device in accordance with the present invention.
Figure 1B:
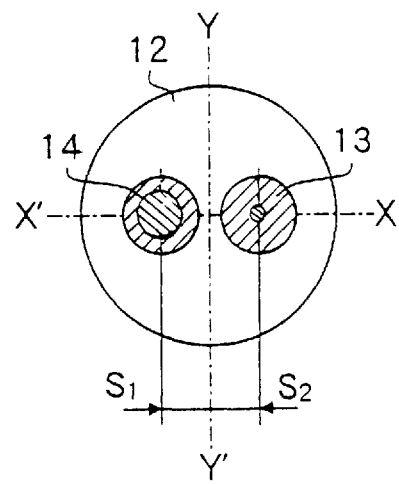
FIG. 1B is a sectional view along with the arrow line shown in FIG. 1A.

Referring mainly to the accompanying drawings, the present invention will be described in further detail. FIG. 1A and 1B are sectional views illustrative of an embodiment of an optical device in accordance with the present invention. One end surface of a GRIN rod lens 11 is provided with a reflecting surface 10; the reflecting surface may be a complete reflecting surface or it may be a reflecting surface which has a wavelength-selective characteristic. A ferrule 12 supports the distal ends of a first optical fiber 13 and a second optical fiber 14 symmetrically with respect to the central axis thereof so that $S_1$ equals $S_2$ in the drawing; the ferrule 12 is connected to the other end surface of the GRIN rod lens 11 with the central axis thereof aligned with the optical axis of the GRIN rod lens 11. A core diameter of the second optical fiber 14 is made sufficiently larger than a core diameter of the first optical fiber 13 so as to allow nearly all reflected light to be admitted into the core, thereby eliminating the loss caused by misaligned cores. The mode field diameter of the second optical fiber can be made sufficiently larger than that of the first optical fiber by using a single-mode optical fiber for the first optical fiber 13 while using a multi-mode optical fiber for the second optical fiber 14. Using the complete reflecting surface for the reflecting surface 10 enables the aforesaid optical device to be used for connecting the first optical fiber and the second optical fiber. Using the reflecting surface with the wavelength-selective characteristic for the reflecting surface 10 enables the optical device to be used as a device which accepts only a particular wavelength.

FIG. 2A to 2C are sectional views illustrative of an embodiment of an optical coupler, i.e. an optical wavelength demultiplexer/multiplexer, in accordance with the present invention. A first GRIN rod lens 11a and a second GRIN rod lens 11b are disposed with the optical axes thereof aligned. A pass filter 10 is disposed between the two GRIN rod lenses. A first ferrule or the ferrule 12 on the opposite side supports the distal ends of the first optical fiber 13 and the second optical fiber 14 symmetrically with respect to the central axis thereof so that $S_1$ equals $S_2$ in the drawing. The ferrule 12 on the opposite side is placed with the central axis thereof aligned with the optical axis of the first GRIN rod lens 11a.

The first optical fiber 13 is a single-mode optical fiber having a mode field radius of 4 μm, while the second optical fiber 14 is a multi-mode optical fiber having a mode field radius of 25 μm which is sufficiently larger than that of the first optical fiber.

A second ferrule or a ferrule 16 on the transmitting end supports a third optical fiber 17; it is connected to a second GRIN rod lens 11b through a distal end surface 18. At this time, adjustment is made so that the centers of the respective optical fibers are aligned on a plane X–X'.

A ray of light from the first optical fiber 13 enters the first GRIN rod lens 11a, then it is reflected by the pass filter 10 and led into the second optical fiber 14. The ray of light which has passed through the pass filter 10 and also the second GRIN rod lens 11b is received by the third optical fiber 17.

If the transmitting wavelength of the pass filter 10 is set to $\lambda_1$ and the reflecting wavelength thereof is set to $\lambda_2$, then coupling the light which includes the wavelengths $\lambda_1$ and $\lambda_2$ to the first optical fiber causes a part of the light having the wavelength $\lambda_1$ to be taken out through the third optical fiber 17 while a part of the light having the wavelength $\lambda_2$ to be taken out through the second optical fiber. Thus, this bidirectional optical wavelength demultiplexer/multiplexer employs the multi-mode optical fiber 14 having the larger core diameter for the reflected light receiving end where it is most difficult to align the optical axes, enabling significantly alleviated restrictions on the permissible optical axis dislocation relative to the single-mode optical fiber 13 with respect to the optical axes of the GRIN rod lenses.

Figure 3:
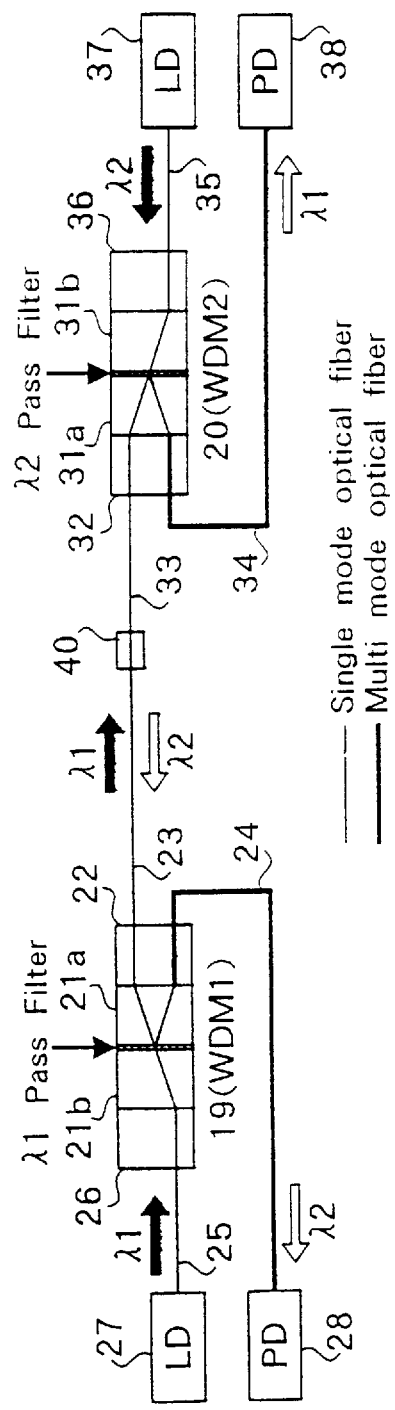
FIG. 3 is a block diagram showing an optical communications system which utilizes the embodiment in accordance with the present invention.
Figure 4A:
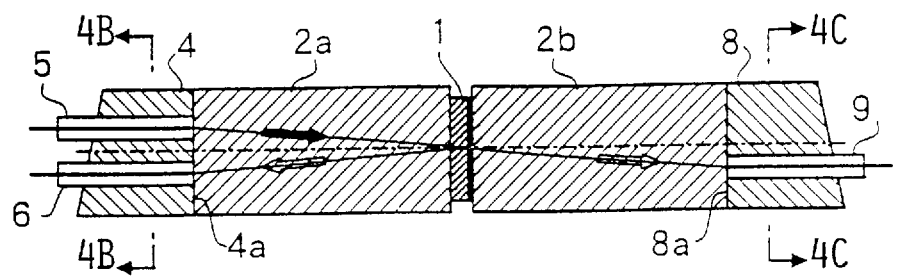
FIG. 4A is a sectional view illustrative of a reference example for describing a problem with an optical device.
Figures 4B, 4C:
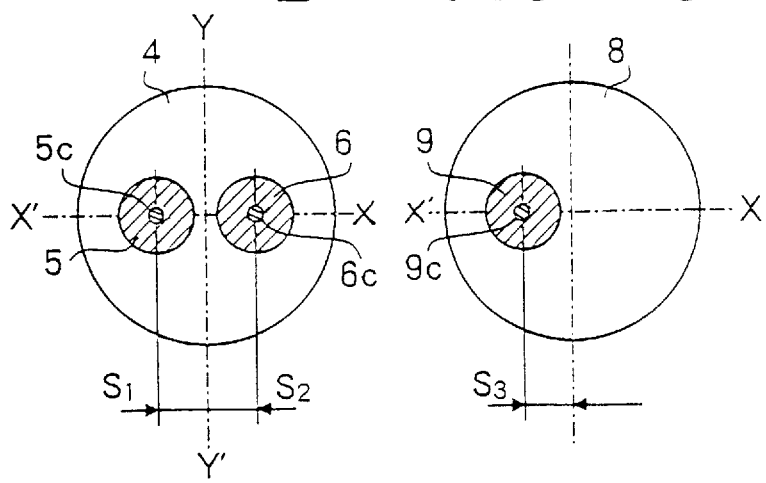
FIG. 4B is a sectional view along with the line 4B—4B shown in FIG. 4A.
FIG. 4C is a sectional view along with the line 4C—4C shown in FIG. 4A.

FIG. 3 is a block diagram illustrative of an optical communications system which uses the embodiment in accordance with the present invention. The communications system employs a pair of the optical devices, i.e. the bidirectional optical wavelength demultiplexers/multiplexers which have been described in conjunction with FIG. 2A to 2C. In a first optical device 19, the pass filter has the transmitting wavelength of $\lambda_1$ and the reflecting wavelength of $\lambda_2$; in a second optical device 20, the pass filter has the transmitting wavelength of $\lambda_2$ and the reflecting wavelength of $\lambda_1$. A first optical fiber 23 of the first optical device 19 and a first optical fiber 33 of the second optical device 20 are connected by a connecting means 40.

A ray of light of the wavelength of $\lambda_1$ which has been transmitted from a transmitter (LD) 27 to a third optical fiber 25 of the first optical device 19 is taken out via a second optical fiber 34 of the second optical device 20; it is then received by a receiver (PD) 38. A ray of light of the wavelength of $\lambda_2$ which has been transmitted from a transmitter (LD) 37 to a third optical fiber 35 of the second optical device 20 is taken out through a second optical fiber 24 of the first optical device 19 and received by a receiver (PD) 28.

The first and third optical fibers of the respective optical devices are single-mode optical fibers, while the second optical fibers are multi-mode optical fibers which have sufficiently larger mode field radii than those of the first and third optical fibers. However, in an optical wavelength demultiplexer/multiplexer which employs the multi-mode optical fibers 24 and 34 for receiving the reflected light, the multi-mode optical fibers should be used only for covering a distance of a few meters to a photoreceptor.

The optical wavelength demultiplexer/multiplexer for single-mode optical fibers in accordance with the present invention employs a multi-mode optical fiber which has a larger core diameter for receiving reflected light, thereby markedly alleviating the restrictions on the permissible dislocation relative to a single-mode optical fiber with respect to the optical axes of GRIN rod lenses. This has resulted in considerably easier assembly than in a case where only single-mode optical fibers are used.

In this invention, it is apparent that various modifications can be formed on this basis of the invention without departing from the spirit and scope of the invention. For example, in the embodiment shown in FIG. 2A to 2C, the third optical fiber may also have a sufficiently large core diameter just like the second optical fiber.

What is claimed is:

1. An optical device comprising:

a GRIN rod lens;

a reflecting surface which is disposed on one end surface of said GRIN rod lens; and a ferrule which supports the distal ends of a first optical fiber and a second optical fiber symmetrically with respect to a central axis thereof and which is connected to the other end surface of said GRIN rod lens with the central axis thereof aligned with the optical axis of said GRIN rod lens;

wherein the core diameter of said second optical fiber is made sufficiently larger than the core diameter of said first optical fiber.

2. An optical device according to claim 1, wherein said first optical fiber is a single-mode optical fiber, while said second optical fiber is a multi-mode optical fiber.

3. An optical wavelength demultiplexer/multiplexer comprising:

a first GRIN rod lens and a second GRIN rod lens which are disposed with the optical axes thereof aligned;

a pass filter which is disposed between said GRIN rod lenses;

a first ferrule which supports the distal ends of a first optical fiber and a second optical fiber symmetrically with respect to the central axis thereof and which is disposed with the central axis thereof aligned with the optical axis of said first GRIN rod lens; and a second ferrule which supports a third optical fiber;

wherein a ray of light which enters said first GRIN rod lens from said first optical fiber and which is reflected by said pass filter is led into said second optical fiber, and the ray of light then passes through said pass filter and said second GRIN rod lens before it is received by said third optical fiber; and the core diameter of said second optical fiber is made sufficiently larger than the core diameter of said first optical fiber.

4. An optical device according to claim 3, wherein said first and third optical fibers are single-mode optical fibers, while said second optical fiber is a multi-mode optical fiber.

5. An optical device according to claim 1, wherein the core diameter of said second optical fiber is 50 μm or more.

6. A bidirectional communications system comprising:

a first optical device according to claim 3, wherein the transmitting wavelength of said pass filter is set to $\lambda_1$, and the reflecting wavelength thereof is set to $\lambda_2$;

a second optical device according to claim 3, wherein the transmitting wavelength of said pass filter is set to $\lambda_2$ and the reflecting wavelength thereof is set to $\lambda_1$; and means for connecting a first optical fiber of said first optical device and a first optical fiber of said second optical device;

wherein a ray of light of the wavelength $\lambda_1$ transmitted from a third optical fiber of said first optical device is received via a second optical fiber of said second optical device; and a ray of light of the wavelength $\lambda_2$ transmitted from a third optical fiber of said second optical device is received via a second optical fiber of said first optical device.

* * * * *